United States Patent [19]
Shuert

[11] Patent Number: 6,135,294
[45] Date of Patent: Oct. 24, 2000

[54] METHOD AND APPARATUS FOR PACKING AND TRANSPORTING ARTICLES

[76] Inventor: Lyle H. Shuert, 70 Kingsley Manor Dr., Bloomfield Hills, Mich. 48304

[21] Appl. No.: 09/012,497

[22] Filed: Jan. 23, 1998

[51] Int. Cl.[7] ............................................. A47F 7/00
[52] U.S. Cl. ............................................. 211/13.1
[58] Field of Search .................... 211/13.1, 49.1, 211/59.4, 40, 169

[56] References Cited

U.S. PATENT DOCUMENTS

| | | |
|---|---|---|
| 2,998,141 | 8/1961 | Moore et al. . |
| 3,200,958 | 8/1965 | Hudgeons, Sr. et al. . |
| 3,752,545 | 8/1973 | Schweizer ................... 211/40 |
| 3,897,871 | 8/1975 | Zinnbauer ................... 211/40 |
| 4,489,835 | 12/1984 | Tombal et al. . |
| 4,976,092 | 12/1990 | Shuert . |
| 5,005,712 | 4/1991 | Niederprum . |
| 5,217,121 | 6/1993 | Walker . |
| 5,283,603 | 2/1994 | Kronbauer et al. . |
| 5,437,379 | 8/1995 | Wolf et al. ................... 211/13.1 |
| 5,551,577 | 9/1996 | Hagopian ................... 211/40 |
| 5,662,228 | 9/1997 | Mendoza et al. ............. 211/169 |
| 5,676,066 | 10/1997 | Cavalier et al. . |

Primary Examiner—Alvin Chin-Shue
Assistant Examiner—Sarah Purol
Attorney, Agent, or Firm—Young & Basile, P.C.

[57] ABSTRACT

A method and apparatus for handling mass produced articles utilizing a rack including a base structure and spaced left and right leaf assemblies. Each leaf assembly includes a plurality of leaf sections positioned in serial relation along the base between the base ends with each leaf section hinged at a lower edge thereof to the base along a lateral hinge axis in generally parallel spaced relation to the hinge axes of adjacent leaf sections. The left and right leaf assemblies are spaced laterally to define a central corridor therebetween extending between the base ends to allow movement of a worker carrying an article down the corridor. The spaced left and right leaf assemblies define a plurality of leaf sets with each set including a leaf section from the left leaf assembly and a corresponding, aligned leaf section from the right leaf assembly. In use, with the leaf sections of the first leaf set positioned in a forwardly angled position, an article is loaded onto the rear face of the first leaf set, the next adjacent leaf set is pivoted to a position in overlying relation to the first leaf set to sandwich the article therebetween, whereafter a further article is positioned on the rear face of the second leaf set, a third leaf is pivoted to a position to sandwich the article on the second leaf set between the second and third leaf sets, and the process is repeated until all of the leaf sets have been pivoted forwardly with an article positioned between each successive set of leaves.

10 Claims, 4 Drawing Sheets

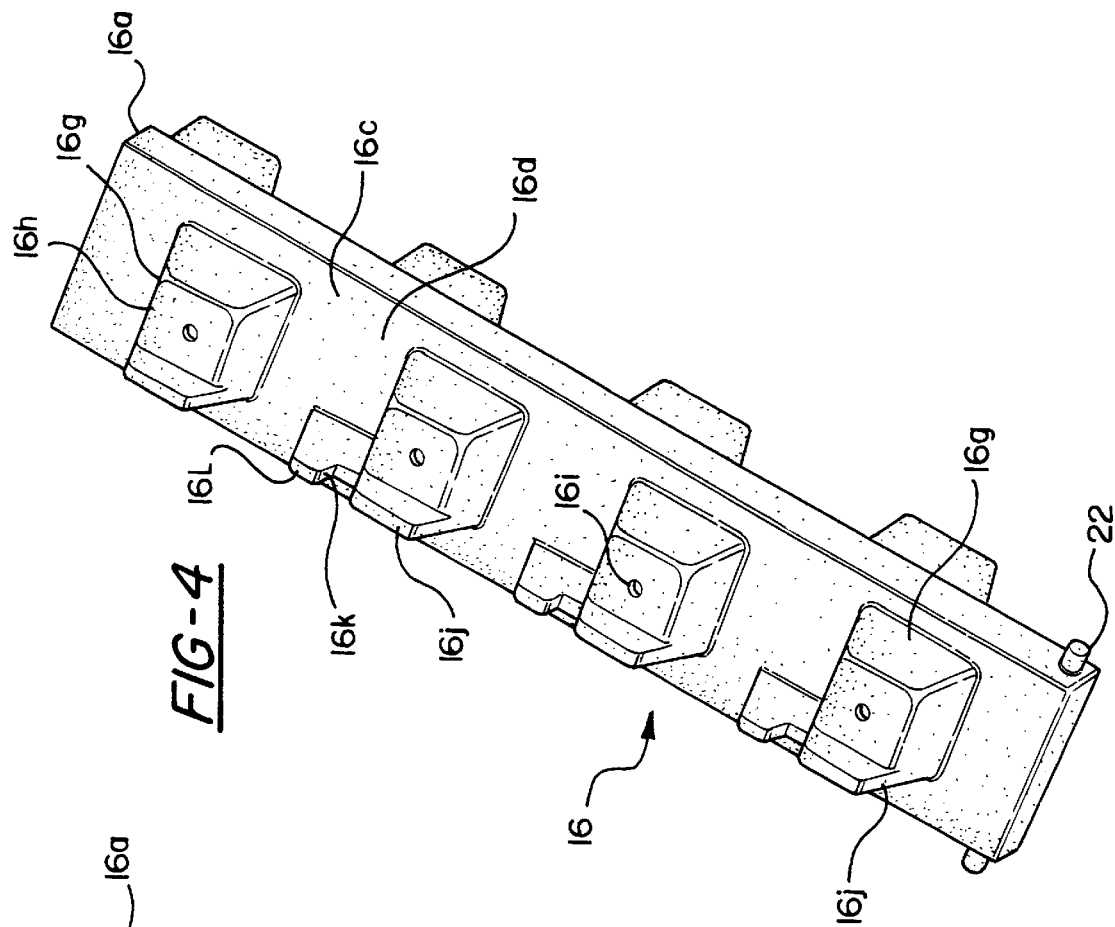
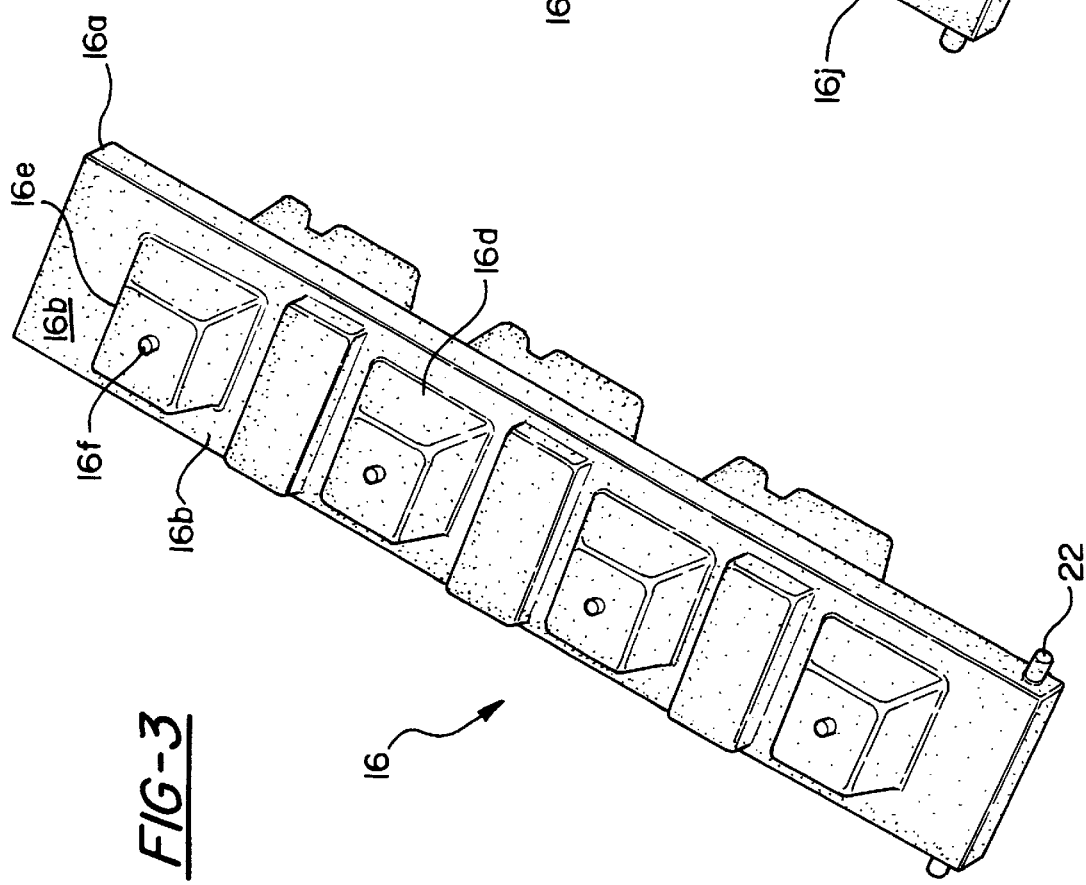

METHOD AND APPARATUS FOR PACKING AND TRANSPORTING ARTICLES

BACKGROUND OF THE INVENTION

This invention relates to methods and apparatus for packing and transporting mass produced articles, such, for example, as automotive bumpers.

Many articles are utilized in mass quantities in modern day production procedures. For example, bumpers are used in mass quantities in the production of motor vehicles and it is necessary to pack and transport the bumpers during the course of producing the motor vehicle. During such packing and transport, it is imperative that the articles be protected from both surface and cosmetic damage as well as from stresses such as might produce structural damages to the articles. It is also imperative that the transport of the articles from the parts facility producing the articles to the vehicle fabrication site be done in a minimum of time and with a minimum of labor so as to minimize the ultimate cost of the vehicle. Various methods and apparatus are currently in use to transport articles within and between parts and assembly facilities. For example, various forms of racks and containers are currently employed, utilizing customized dunnage to protect the articles from damage during transport. However, these prior art racks and containers utilizing customized dunnage require that the dunnage be individually prepared with each use of the rack and container, require relatively complicated maneuvers to ensure that the articles are suitably positioned within the rack or container in association with the dunnage, require relatively complicated maneuvers to ensure that the articles are removed from the container or rack without damage, and require frequent replacement of the dunnage since the dunnage is frequently damaged or destroyed in the process of the loading, packing, transporting and unloading operations.

SUMMARY OF THE INVENTION

The invention rack provides a convenient and efficient means for packing and transporting mass produced articles.

The rack of the invention includes a base having opposite forward and rearward ends; a left leaf assembly comprising a plurality of leaf sections positioned in serial relation along the base between the base ends with each left leaf section hinged at a lower edge thereof to the base along a lateral hinge axis in generally parallel spaced relation to the hinge axes of adjacent left leaf sections; and a right leaf assembly comprising a plurality of right leaf sections positioned in serial relation along the base between the base ends with each right leaf section hinged at a lower edge thereof to the base along a lateral hinge axis in generally parallel spaced relation to the hinge axes of adjacent leaf sections, with each right leaf section in lateral alignment with a respective left leaf section, and with the inboard ends of the respective left and right leaf sections spaced laterally to define a central corridor therebetween extending between the base ends. With this arrangement, the rack may be readily loaded and unloaded by a worker or machine carrying an article down the corridor to load the article on a left leaf section and an aligned right leaf section.

According to further feature of the invention, means are provided to maintain spacing between adjacent first and second left leaf sections and between adjacent first and second right leaf sections. This arrangement insures that the packed articles are positioned in protective spaces between the leaf sections.

According to further feature of the invention, each leaf section comprises a generally planar main body structure and the spacing means comprise protuberances extending from the general plane of the main body structure of the first leaf sections for engagement with the adjacent second leaf sections. In the disclosed embodiment of the invention, the spacing means further includes protuberances extending from the general planar main body structure of the second leaf sections for spacing coaction with the protuberances extending from the main body section of the first leaf sections.

According to further feature of the invention, each leaf includes forwardly and rearwardly extending protuberances and the forwardly extending protuberances of each leaf section are vertically staggered with respect to the rearwardly extending protuberances of that section. With this arrangement, as each leaf section is moved from a rearwardly angled position to a forwardly angled position, a forwardly extending protuberance on a forward face of the leaf section may move into coaction with a rearwardly extending protuberance on a forward leaf section.

According to further feature of the invention the rear face of each leaf section further defines notch means to maintain an article in a respective space against the rear face of the forward leaf section. With this arrangement, each article is positioned in a space between forward and rearward leaf sections and is precluded from movement within the space by the notch means defined on the rear face of the forward leaf section.

The invention further provides a method of packing and transporting mass produced articles. According to the invention method, a rack structure is provided having a base including opposite forward and rearward ends; a plurality of leaf sets are provided positioned in serial relation along the rack between the end structures with each leaf set hinged at a lower edge thereof to the base along a lateral hinge axis in generally parallel spaced relation to the hinge axes of adjacent leaf sets, with each leaf set comprising left and right leaf sections spaced laterally at their inboard ends to define a central corridor therebetween extending between the base ends, and with the left and right leaf section of each leaf set pivotally moveable between a rearwardly angled position and a forwardly angled position; the leaf sections are positioned in their rearwardly angled position; the left and right sections of one of the leaf sets are pivoted to their forwardly angled positions; an article is positioned on rearward faces of the left and right sections of the one leaf set; the left and right sections of the next adjacent leaf set are pivoted to their forwardly angled positions in overlying relation to the article; and the last three steps are repeated until a plurality of articles are positioned in sandwich interspersed fashion between successive forwardly angled leaf sets. This methodology allows the rapid and efficient packing and transporting of a plurality of articles.

According to further feature of the invention methodology, each article is moved down the corridor from the rearward end of the base toward the forward end of the base prior to positioning on a respective leaf set. This method provides convenient loading and unloading of the rack.

BRIEF DESCRIPTION OF THE DRAWINGS

FIG. 3 is a perspective view of the rear face of a leaf employed in the invention rack;

FIG. 4 is a perspective view of the front face of the leaf of FIG. 3;

DESCRIPTION OF THE PREFERRED EMBODIMENT

Figure 1:
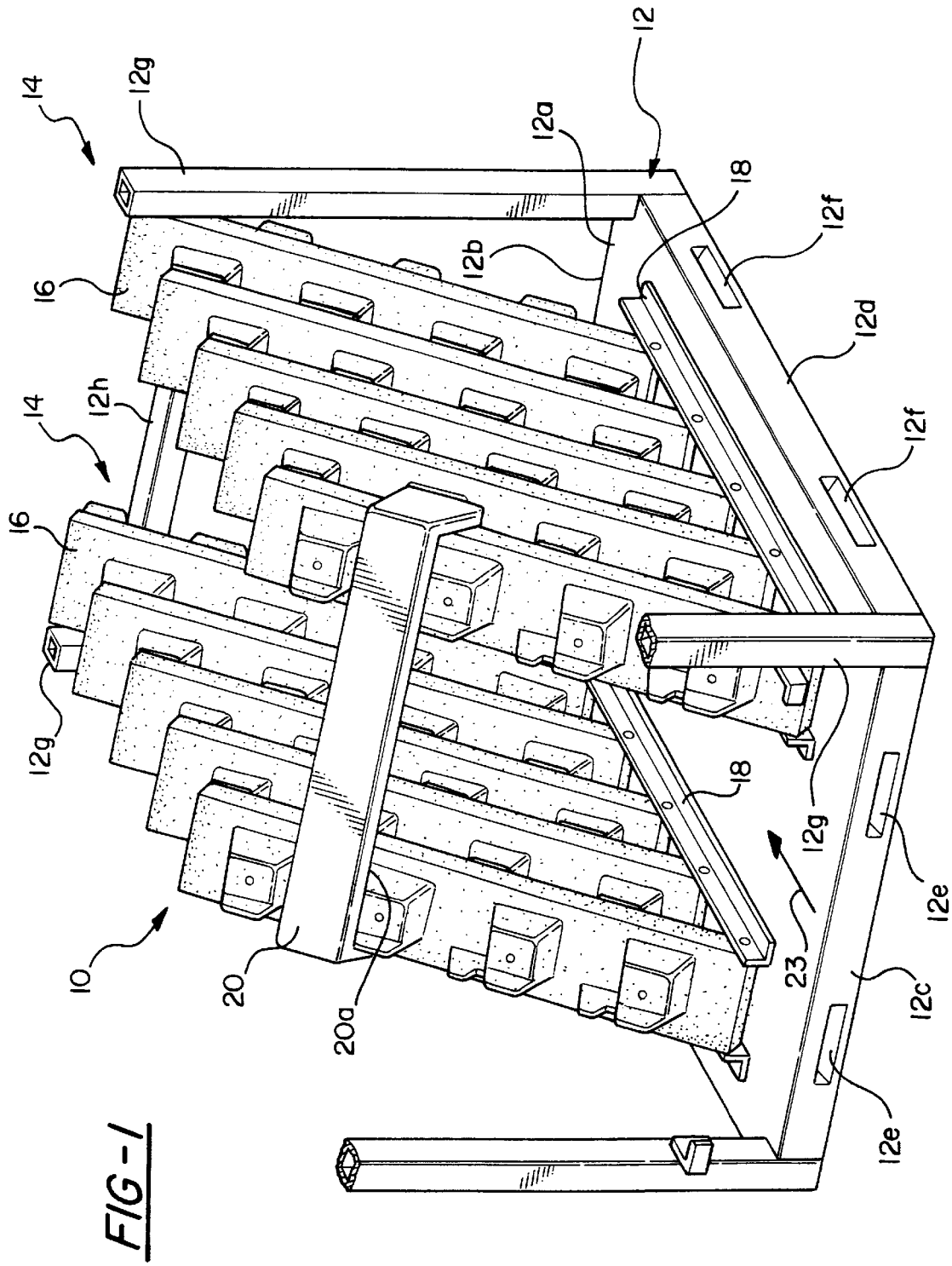
FIG. 1 is a schematic view of a rack according to the invention.
Figure 2:
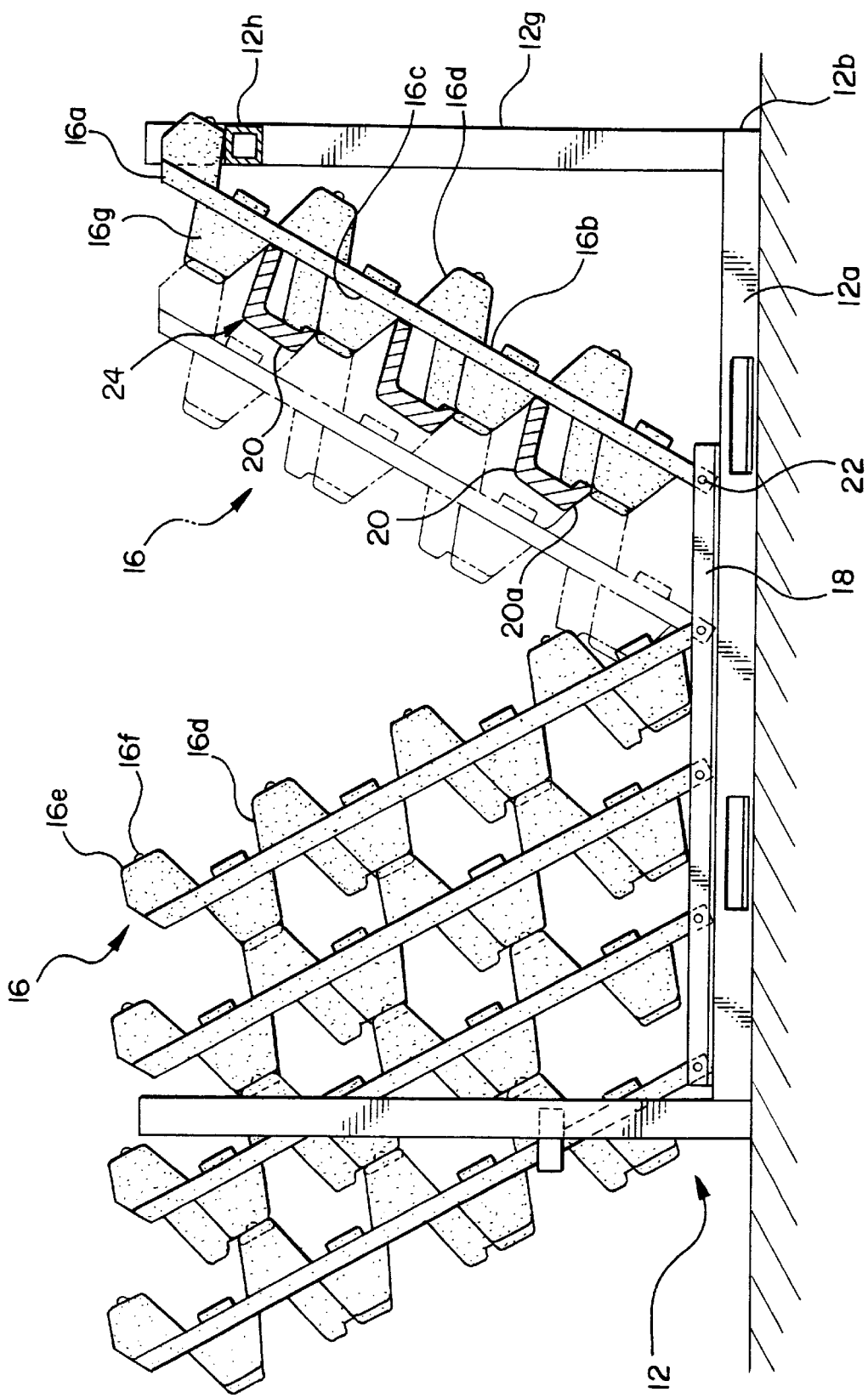
FIG. 2 is a side elevational view of the rack of FIG. 1
Figure 5:
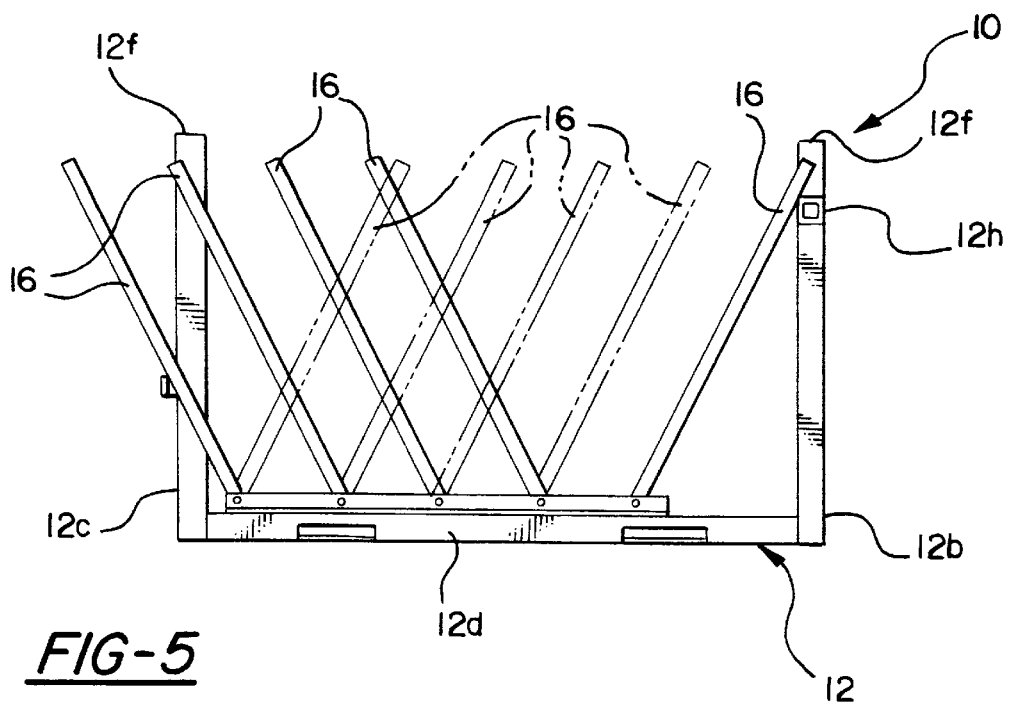
FIG. 5 is a schematic side elevational view of the invention rack showing the operation of the rack.
Figure 6:
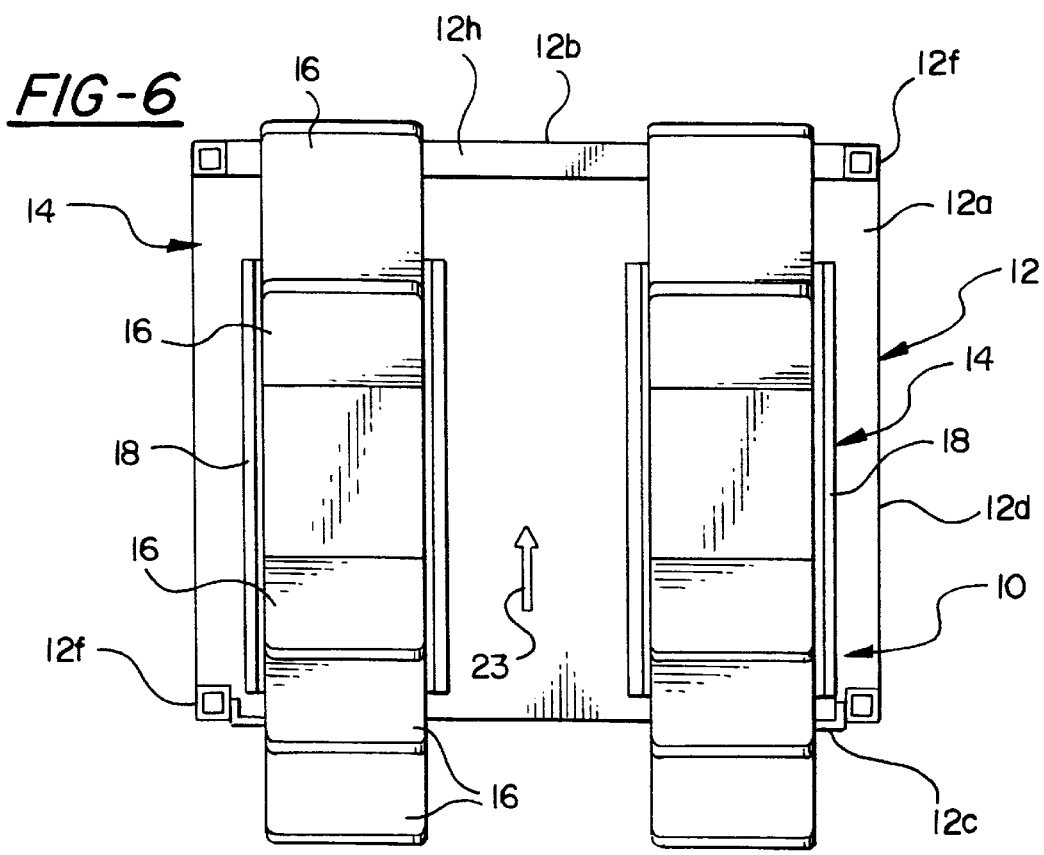
FIG. 6 is a schematic top view of the invention rack.

The rack 10 of the invention, broadly considered includes a base structure 12 and left and right leaf assemblies 14.

Base structure 12 includes a generally planar, rectangular platform 12a preferably formed of a suitable ferrous material. Although shown as comprising a single planar structure, platform 12a may of course be formed of interconnected beam members. Platform 12a includes a front end 12b, a rear end 12c, and side edges 12d. Forklift passages 12e opening in ends 12b/12c extend the length of the platform to allow the entry of the forks of a forklift vehicle approaching from either end of the rack and transverse forklift passages 12f opening in the side edges 12d allow the entry of the forklifts from either side of the rack. Base structure 12 further includes a column or post 12g upstanding from each corner of the platform 12a and a cross-rail 12h extending between the front posts 12g at a location proximate the upper ends of the posts.

Each leaf assembly 14 comprises a plurality (for example 5) of leaf sections 16 positioned in serial relation along the base between the base ends with each leaf section hinged at a lower edge thereof to the base along a lateral hinge axis in generally parallel spaced relation to the hinge axes of adjacent leaf sections. Each leaf assembly further includes a pair of laterally spaced rails 18 suitably secured to the upper face of platform 12a and extending longitudinally of the platform to mount the lower ends of the leaf sections in serial relation along the base structure. Rails 18 may, for example, comprise angle irons suitably fixedly secured to the upper face of the base platform. Each leaf section is preferably formed of a suitable plastic material and is preferably formed as a twin sheet article with individual sheets vacuum formed to individual molds and the thermoformed sheets, while still in a heated condition, brought together to fuse the sheets selectively and form the twin sheet article.

Each leaf section 16 includes a main body, generally planar, generally rectangular, and vertically elongated portion 16a defining a front vertical face 16b and a rear vertical face 16c. A series of vertically spaced protuberances 16d extend forwardly from the front face 16b of each leaf section and each terminates in a top wall 16e defining a hemispherical pin 16f. A series of vertically spaced protuberances 16g extend rearwardly from the rear face 16c of the leaf section and each protuberance terminates in a top wall 16h defining a hemispherical recess 16i sized to recieve a respective pin 16f on a protuberance 16d. For example, four vertically spaced protuberances 16g may extend from the rear face 16c of the leaf section and an article positioning rib structure 16j may be provided in lateral association with the three lowermost protuberances 16g. Each rib structure 16j defines a slot or groove 16k for guiding receipt of an edge of a suitable elongated article such, for example, as a motor vehicle bumper 20. Each rib structure further includes a support surface 16l above a respective slot 16k to provide support for a bumper positioned with a lower edge 20a thereof in the associated slot 16k.

The protuberances 16d on the front face 16b of the sections are staggered vertically with respect to the protuberances 16g on the rear face 16c of the section so that, considered vertically, a protuberance 16d is positioned between each pair of vertically spaced protuberances 16g and vice versa. Each leaf section further includes pivot means 22 to facilitate pivotal attachment of the leaf section to the base structure utilizing spaced rails 18.

The left and right leaf assemblies are pivotally mounted on the top face of the base structure platform with the leaf sections on the left leaf assembly respectively laterally aligned with the leaf sections on the right leaf assembly so that the left and right leaf assemblies coact to define a plurality of leaf sets positioned in serial relation along the base with each leaf set comprising a left leaf section hinged at a lower edge thereof to the base along a lateral hinge axis and a right leaf section hinged at a lower edge thereof to the base along a lateral hinge axis in alignment with and coincident with the lateral hinge axis of the respective left leaf section to form a set of leaf sections. Thus, with five leaf sections in each leaf assembly, as shown, five leaf sets are defined Whereas all leaf sets may be arranged for pivotal movement on the rack between a rearwardly angled position and a forwardly angled position, it is preferable that the front left and right leaf sections be permanently fixed in their forwardly angled position by suitable securement to base structure cross-rail 12g. The remaining leaf sets positioned rearwardly of the front leaf set are free to move between a rearwarldy angled position and a forwardly angled position by virtue of their hinged connection at their lower ends to the rails 18.

The left and right leaf sections are laterally spaced on the upper face of the base platform and, specifically, the inboard ends of the left leaf sections are laterally spaced with respect to the inboard ends of the corresponding right leaf sections to define a central corridor 23 between the left and right leaf assemblies accessible from the rear edge 12c of the rack. The corridor 23 preferably has a width sufficient to allow a worker to walk comfortably down the corridor carrying a bumper to be stored on the rack.

In use, and with the forward leaf sections fixed in their forwardly angled position and the remaining leaf sets positioned in a rearwardly angled position, a worker carrying a bumper 20 may move down the corridor 22 from the rear end 12c of the rack and place the bumper laterally on the forward left and right leaf sections with the lower edge 20a of the bumper positioned in the notches 16k associated with the lowermost protuberances 16g whereafter the worker may walk rearwardly down the corridor and out of the rear end of the rack to retrieve a second bumper, walk forwardly down the corridor with the second bumper and place the second bumper in the notches 60k associated with the next higher set of protuberances 16g, and repeat the procedure to position a third bumper in the notches 16k associated with a third higher set of protuberances 16g. Once three bumpers have been loaded onto the rear face of the front leaf set, the left and right leaf sections of the next leaf set are pivoted forwardly from their rearwardly angled to their forwardly angled positions.

As the leaf sections assume their forwardly angled positions, they move into overlying protective relationship with respect to the bumpers 20 mounted on the first leaf set. Specifically, the forwardly extending protuberances 16d on the second leaf set move into respective coaction with the rearwardly extending protuberances 16g on the first leaf set to define a plurality of vertically spaced spaces or pockets 24 between the first and second leaf sets within which the respective bumpers 20 are ensconced. The pins 16f on the protuberances 16d coact with the recesses 16i on the protuberances 16g to assure positive alignment of the protuberances and preclude unwanted vertical relative displacement between the leaves.

This procedure may now be repeated with respect to all of the leaf sets with the worker walking up and down the corridor 22 to position the bumpers 20 on the rear face of the forwardly pivoted leaf set and thereafter pivoting the next successive leaf set forwardly into covering protective relationship with respect to the loaded bumpers until all of the leaf sets have been pivoted to their forwardly angled position. With the construction shown, whereby each leaf set accommodated three bumpers, the loaded rack will accommodate 12 bumpers 20 with each bumper portioned firmly and protectively within a pocket or space 24 defined between successive leaf sets and with each bumper located positively within its respective pocket by virtue of the engagement of the bumper edge 20a in the notches 16k and the positioning of the underface of the bumper on the surfaces 16l.

Following packing of the bumpers onto the rack by successive pivotal movement of the leaf sets, the rack may be engaged by a forklift apparatus and moved either to a storage location or to an assembly line location. To unload the rack, the bumpers on the rearmost leaf set are unloaded, the rearmost leaf set is pivoted rearwardly, the bumpers on the next leaf set are unloaded, the next leaf set is pivoted rearwardly, etc. until all of the bumpers have been unloaded. A worker positioned in the corridor 23 and moving back and forth down the corridor 23 facilitates the unloading of the bumpers just as the corridor facilitates loading of the bumpers by allowing free movement of a worker carrying a bumper up and down the corridor.

The rearwardly angled positions of the leaf sets may be established by the engagement of the lowermost rib structures 16j of the leaf sections of the respective leaf sets with the upper surface of the rack platform portion or, alternatively, means may be provided on the rear posts 12g to engage the rear face of the rearmost leaf set to establish the rearwarldy angled position of the leaf sections of the rearmost leaf section in which case the rearmost position of the remaining pivotal leafs sets are established by successive engagement of the rearwardly pivoted leaf sets.

The invention will be seen to provide an apparatus and methodology to facilitate the loading and unloading of mass produced articles. Specifically, the inventions methodology and apparatus by virtue of the central corridor between the left and right leaf assemblies, enables a worker to move up and down the corridor to expedite the loading and unloading of the articles onto the leaf sets and the coacting protuberances on the leaf sections define protective pockets to firmly but protectively receive each article for storage and/or transportation.

Whereas a preferred embodiment of the invention has been illustrated and described in detail, it will be apparent that various changes may be made in the disclosed embodiment without departing from the scope or spirit of the invention. For example, whereas the invention has been illustrated and described with respect to a rack in which a plurality of vertically spaced elongated articles are positioned between seccessive left and right leaf sections, the invention may also be practiced with respect to a rack in which a single sheet-like article is positioned between successive leaf sets.

What is claimed is:

1. A rack for packing and transporting mass produced articles comprising:

a base having opposite forward and rearward ends;

a left leaf assembly comprising a plurality of leaf sections positioned in serial relation along a left region of the base between the base ends with each left leaf section hinged at a lower edge thereof to the base along a lateral hinge axis in generally parallel spaced relation to the hinge axes of adjacent left leaf sections; and a right leaf assembly comprising a plurality of right leaf sections positioned in serial relation along a right region of the base between the base ends with each right leaf section hinged at a lower edge thereof to the base along a lateral hinge axis in generally parallel spaced relation to the hinge axes of adjacent right leaf sections, with each right leaf section in lateral alignment with a respective left leaf section, with each left leaf section defining a right inboard edge and each right leaf section defining a left inboard edge, and with the left and right inboard edges of a respective left and right leaf section spaced laterally to define a central corridor therebetween extending between the base ends to allow movement of a worker or machine carrying an article down the corridor between the left and right leaf assemblies to load the article on a left leaf section and an aligned right leaf section.

2. A rack according to claim 1 wherein means are provided to maintain spacing between adjacent first and second left leaf sections and between adjacent first and second right leaf sections.

3. A rack according to claim 2 wherein:

each leaf section comprises a generally planar main body structure; and the spacing means comprise protuberances extending from the general plane of the main body structure of the first leaf sections for engagement with the adjacent second leaf sections.

4. A rack for packing and transporting mass produced articles comprising:

a base having opposite forward and rearward ends;

a left leaf assembly comprising a plurality of leaf sections positioned in serial relation along the base between the base ends with each left leaf section hinged at a lower edge thereof to the base along a lateral hinge axis in generally parallel spaced relation to the hinge axes of adjacent left leaf sections;

a right leaf assembly comprising a plurality of right leaf sections positioned in serial relation along the base between the base ends with each right leaf section hinged at a lower edge thereof to the base along a lateral hinge axis in generally parallel spaced relation to the hinge axes of adjacent right leaf sections, with each right leaf section in lateral alignment with a respective left leaf section, and with the inboard ends of a respective left and right leaf section spaced laterally to define a central corridor therebetween extending between the base ends to allow movement of a worker or machine carrying an article down the corridor to load the article on a left leaf section and an aligned right leaf section;

each leaf section including a generally planar main body portion defining a forward vertical face and a rearward vertical face;

each leaf section defining a series of vertically spaced protuberances extending rearwardly from the rearward vertical face; and each leaf section further defining a series of vertically spaced protuberances extending forwardly from the forward vertical face.

5. A rack according to claim 4 wherein the forwardly extending protuberances of each leaf section are vertically staggered with respect to the rearwardly extending protuberances of that section.

6. A rack according to claim 5 wherein:

each leaf is pivotal on the base between a rearwardly angled position and a forwardly angled position;

with adjacent left and right leaf sections both pivoted forwardly, the rearwardly extending protrusions on the forward leaf sections coact with the forwardly extending protrusions on rearward leaf sections to define a series of vertically spaced pockets between the sections for respective receipt of articles.

7. A rack according to claim 6 wherein the rear face of each leaf section further defines notch means to maintain an article in a respective pocket against the rear faces of the forward leaf sections.

8. A method of packing and transporting mass produced articles comprising the steps of:

providing a rack structure having a base having opposite forward and rearward ends:

providing a plurality of leaf sets positioned in serial relation along the rack between the base ends with each leaf set hinged at a lower edge thereof to the base along a lateral hinge axis in parallel spaced relation to the hinge axes of adjacent leaf sets, with each leaf set comprising left and right leaf sections, with each left leaf section positioned on a left region of the base and defining a right inboard edge, with each right leaf section positioned on a right region of the base and defining a left inboard edge, and with the right and left inboard edges of a respective left and right leaf set spaced laterally at their inboard ends to define a central corridor therebetween extending between the base ends, and with the left and right leaf sections of each leaf set pivotally moveable between a rearwardly angled position and a forwardly angled position;

positioning the leaf sections in their rearwardly angled positions;

pivoting the left and right sections of one of the leaf sets to their forwardly angled positions;

moving an article down the corridor from the rearward end of the base toward the forward end of the base and positioning the article on rearward faces of the left and right sections of the one leaf set;

pivoting the left and right sections of the next adjacent leaf set to their forwardly angled positions in overlying relation to the article; and repeating the last two steps until a plurality of articles are positioned in sandwich, interspersed fashion between successive forwardly angled leaf sets.

9. A method according to claim 8 wherein:

the left and right leaf sections each comprise a generally planar vertically extending main body structure and protuberances extending from a vertical face of the main body structure; and the protuberances act to define a series of vertically spaced pockets between the left and right sections of adjacent forwardly pivoted leaf sets for receipt and protection of articles.

10. A rack for packing and transporting mass produced articles comprising:

a base having opposite forward and rearward ends;

a left leaf assembly comprising a plurality of leaf sections positioned in serial relation along the base between the base ends with each left leaf section hinged at a lower edge thereof to the base along a lateral hinge axis in generally parallel spaced relation to the hinge axes of adjacent left leaf sections;

a right leaf assembly comprising a plurality of right leaf sections positioned in serial relation along the base between the base ends with each right leaf section hinged at a lower edge thereof to the base along a lateral hinge axis in generally parallel spaced relation to the hinge axes of adjacent right leaf sections, with each right leaf section in lateral alignment with a respective left leaf section, and with the inboard ends of a respective left and right leaf section spaced laterally to define a central corridor therebetween extending between the base ends to allow movement of a worker or machine carrying an article down the corridor to load the article on a left leaf section and an aligned right leaf section;

each leaf section comprising a generally planar main body structure; and means being provided to maintain spacing between adjacent first and second left leaf sections and between adjacent first and second right leaf sections, the spacing means comprising protuberances extending from the general plane of the main body structure of the first leaf sections for engagement with the adjacent second leaf sections and protuberances extending from the general plane of the main body structure of the second leaf sections for coaction with the protuberances extending from the general plane of the main body structure of the first leaf sections.

* * * * *